US009224537B2

(12) United States Patent
Ramaprabhu et al.

(10) Patent No.: US 9,224,537 B2
(45) Date of Patent: Dec. 29, 2015

(54) ELECTRODE AND/OR CAPACITOR FORMATION

(75) Inventors: Sundara Ramaprabhu, Chennai (IN); Ashish Kumar Mishra, Uttar Pradesh (IN)

(73) Assignee: Indian Institute of Technology Madras (IN)

( * ) Notice: Subject to any disclaimer, the term of this patent is extended or adjusted under 35 U.S.C. 154(b) by 160 days.

(21) Appl. No.: 13/817,723

(22) PCT Filed: Jul. 20, 2011

(86) PCT No.: PCT/IB2011/001689
§ 371 (c)(1),
(2), (4) Date: Feb. 19, 2013

(87) PCT Pub. No.: WO2012/164334
PCT Pub. Date: Dec. 6, 2012

(65) Prior Publication Data
US 2013/0155576 A1    Jun. 20, 2013

(30) Foreign Application Priority Data

May 31, 2011  (IN) .......................... 1855/CHE/2011

(51) Int. Cl.
*H01G 4/008*  (2006.01)
*H01G 9/00*   (2006.01)
(Continued)

(52) U.S. Cl.
CPC .............. *H01G 9/0029* (2013.01); *B82Y 10/00* (2013.01); *B82Y 30/00* (2013.01); *B82Y 40/00* (2013.01);
(Continued)

(58) Field of Classification Search
USPC ................. 361/502–504, 509–512, 516–519, 361/525–529, 303–305, 523, 535–536
See application file for complete search history.

(56) References Cited

U.S. PATENT DOCUMENTS 6,124,057 A    9/2000  Ito et al.
6,709,560 B2   3/2004  Andelman et al.
(Continued)

FOREIGN PATENT DOCUMENTS

WO    2010/088086       8/2010
WO    2010088186 A2    8/2010
WO    2010/009469      3/2012

OTHER PUBLICATIONS

Mishra, A.K. and S. Ramaprabhu, Hybrid Carbon Nanostructures for Electrochemical Capacitor, Alternative Energy and Nanotechnology Laboratory (AENL), 3rd International Conference on Advanced Nano Materials Sep. 12-15, 2010, abstract, 1 page.
(Continued)

*Primary Examiner* — Nguyen T Ha
(74) *Attorney, Agent, or Firm* — Moritt Hock & Hamroff LLP; Steven S. Rubin, Esq.

(57) ABSTRACT

Technologies are generally described related to the design, manufacture and/or use of electrodes, capacitors, or any other similar component. In an example, a system effective to form a component may include a container effective to receive graphite nanoplatelets and effective to receive ruthenium chloride. The system may include a coating device in communication with the container. The system may further include a processor arranged in communication with the container and the coating device. The processor may be configured to control the container effective to combine the ruthenium chloride with the graphite nanoplatelets under reaction conditions sufficient to form a ruthenium oxide graphite nanoplatelets nanocomposite. The processor may further be configured to control the coating device effective to coat a support with the ruthenium oxide graphite nanoplatelets nanocomposite.

11 Claims, 6 Drawing Sheets

(51) Int. Cl.
H01G 11/30 (2013.01)
H01G 11/46 (2013.01)
B82Y 30/00 (2011.01)
B82Y 40/00 (2011.01)
B82Y 10/00 (2011.01)
C01B 31/04 (2006.01)

(52) U.S. Cl.
CPC .......... *C01B 31/043* (2013.01); *C01B 31/0423* (2013.01); *H01G 11/30* (2013.01); *H01G 11/46* (2013.01); *Y02E 60/13* (2013.01); *Y10T 29/417* (2015.01)

(56) References Cited

U.S. PATENT DOCUMENTS

| | | | |
|---|---|---|---|
| 7,061,749 | B2 | 6/2006 | Liu et al. |
| 7,229,717 | B2 | 6/2007 | Yamaguchi et al. |
| 7,572,542 | B2 | 8/2009 | Naoi |
| 7,835,137 | B2 | 11/2010 | Kang et al. |
| 8,636,889 | B2 | 1/2014 | Cai et al. |
| 2002/0195407 | A1 | 12/2002 | Levy |
| 2004/0051083 | A1 | 3/2004 | McDonald et al. |
| 2005/0074380 | A1 | 4/2005 | Boren et al. |
| 2005/0079409 | A1 | 4/2005 | Andelman et al. |
| 2005/0279696 | A1 | 12/2005 | Bahm et al. |
| 2006/0027499 | A1 | 2/2006 | Ajayan et al. |
| 2008/0121531 | A1 | 5/2008 | Anderson et al. |
| 2008/0151472 | A1 | 6/2008 | Maletin et al. |
| 2008/0244429 | A1 | 10/2008 | Stading |
| 2008/0261094 | A1 | 10/2008 | Licht et al. |
| 2010/0181200 | A1 | 7/2010 | Yang et al. |
| 2010/0210453 | A1* | 8/2010 | Hu et al. .......... 502/184 |
| 2011/0042206 | A1 | 2/2011 | Tanahashi et al. |
| 2011/0070495 | A1 | 3/2011 | Ban et al. |
| 2011/0151472 | A1 | 6/2011 | Bensussan et al. |
| 2012/0132519 | A1 | 5/2012 | Kang et al. |
| 2012/0186980 | A1 | 7/2012 | Ramaprabhu et al. |

OTHER PUBLICATIONS

Mishra, A. K., Synopsis Lectures on Environmental Applications of Metal Oxide/ Polymer-Carbon Nanocomposites, retrieved from http://www.physics.iitm.ac.in/research_files/synopsis/ashish.pdf, Feb. 2011, 17 pages.
Winter, M.; Brodd, R. What are Batteries, Fuel Cells, and Supercapacitors?, J. Chem. Rev. 2004, 104, 4245.
Diederich, L.; Barborini, E.; Piseri, P.; Podesta, A.; Milani, P., Supercapacitors based on nanostructured carbon electrodes grown by cluster-beam deposition, Appl.Phys. Lett. 1999, 75, 2662.
Shaijumon, M. M.; Ou, F. S.; Ci, L. J.; Ajayan, P. M., Synthesis of hybrid nanowire arrays and their applications as high power supercapacitor electrodes, Chem. Commun. 2008, 20, 2373.
Ganguli, S.; Roy, A.K.; Anderson, D.P. Improved thermal conductivity for chemically functionalized exfoliated graphite/epoxy composites, Carbon., 2008, 46, 806.
Reddy, A.L.M.; Ramaprabhu, S. J., Nanocrystalline Metal Oxides Dispersed Multiwalled Carbon Nantubes as Supercapacitor Electrodes., Phys. Chem. C 2007, 111, 7727.
Wang, Y.; Shi, Z., Huang, Y.; Ma, Y.; Wang, C.; Chen, M.; Chen, Y. J., Supercapacitor Devices Based on Graphene Materials, Phys. Chem. C 2009, 113, 13103.
Liu, X.M.; Zhang, X.G. NiO-based composite electrode with $RuO_2$ for electrochemical capacitors, Electrochim. Acta, 2004, 49, 229.

Lin, Y.S.; Lee, K.Y.; Chen, K.Y.; Huang, Y.S., Superior capacitive characteristics of $RuO_2$ nanorods grown on carbon nanotubes, Appl. Surf Sci. 2009, 256, 1042.
Yan, J. et al., Preparation and electrochemical charateristics of manganese dioxide/graphite nanoplatelet composites, Materials Science and Engineering, Jun. 2008, 151, 174-178.
Gujar, T. P. et al., Electrochemically Deposited Nanograin Ruthenium Oxide as a Pseudocapacitive Electrode, Int. J. Electrochem. Sci., 2007, 666-673, 2.
Patake, V. D. et al., Electrodeposited ruthenium oxide thin films for supercapacitor: Effect of surface treatments, Applied Surface Science, 2009, 4192-4196, 255.
Lin, Kuo-Min, et al, Mesoporous $RuO_2$ for the next generation supercapacitors with an ultrahigh power density, Electrochimica Acta, 2009, 4574-4581, 54.
Amitha, F. E. et al., A non-aqueous electrolyte-based asymmetric supercapacitor with polymer and metal oxide/multiwalled carbon nanotube electrodes, J. Nanopart. Res., 2009, 725-729, 11.
International Search Report for application with application No. PCT/IB2011/001689, dated Nov. 29, 2011, 9 pages.
Mishra A. K. and Ramaprabhu S., "The role of functionalised multiwalled carbon nanotubes based supercapacitor for arsenic removal and desalination of sea water," Journal of Experimental Nanoscience, vol. 7, No. 1, pp. 85-97 (2012).
Chandra, V. et al., "Water-Dispersible Magnetite-Reduced Graphene Oxide Composites for Arsenic Removal," ACS Nano, vol. 4, No. 7, pp. 3979-3986, American Chemical Society (Jun. 16, 2010).
Melitas, N. et al., "Electrochemical Study of Arsenate and Water Reduction on Iron Media Used for Arsenic Removal from Potable Water," Environmental Science and Technology, vol. 36, No. 14, pp. 3188-3193 (Jun. 7, 2002).
Mishra, A.K. and Ramaprabhu S., "Magnetite Decorated Multiwalled Carbon Nanotube Based Supercapacitor for Arsenic Removal and Desalination of Seawater," J. Phys. Chem. C, vol. 114, pp. 2583-2590 (Jan. 27, 2010).
Zhang, D. et al., "Influence of Carbonization of Hot-Pressed Carbon Nanotubes Electrodes on Removal of NaCl from Saltwater Solution," Materials Chemistry and Physics, vol. 96, No. 1, pp. 140-144 (Mar. 10, 2006).
Thirunavukkarasu, O.S., et al., "Arsenic Removal from Drinking Water using Iron Oxide-Coated Sand," Water, Air and Soil Pollution, vol. 142, No. 1-4, pp. 95-111 (Jan. 2003).
Wan, J. et al., "In situ decoration of carbon nanotubes with nearly monodisperse magnetite nanoparticles in liquid polyols," Journal of Materials Chemistry, vol. 17, pp. 1188-1192, The Royal Society of Chemistry (2007).
Wei, Z. and Somasundaran P., "Cyclic voltammetric study of arsenic reduction and oxidation in hydrochloricacid using a PT RDE," Journal of Applied Electrochemistry, vol. 34, No. 2, pp. 241-244 (2004).
Yavuz, C.T., et al., "Low-Field Magnetic Separation of Monodisperse $Fe_3O_4$ Nanocrystals," Science AAAS, vol. 314, pp. 964-967 (Nov. 10, 2006).
Mean, S. et al., "Magnetite Nanoparticles as Adsorbents for Arsenic Removal and Magnetic Separation," Department of Civil and Environmental Engineering and Chemistry, pp. 1-7 (2005).
Yuan, C. et al., "Electrokinetic remediation of arsenate spiked soil assisted by CNT—Co barrier—The effect of barrier position and processing fluid," Journal of Hazardous Materials, vol. 171, No. 1-3, pp. 563-570 (Nov. 15, 2009).
Mitra, S., et al., "Exfoliated graphite—ruthenium oxide composite electrodes for electrochemical supercapacitors," Journal of Power Sources, vol. 185, No. 2, pp. 1544-1549 (Dec. 1, 2008).

* cited by examiner

200

300 A computer program product.

302 A signal bearing medium.

304

At least one of

One or more instructions for a method of forming a component, or

One or more instructions for combining ruthenium with graphite nanoplatelets to form a combination, or One or more instructions for placing at least a part of the combination on a support; or One or more instructions for placing at least a first portion of the combination on a first support; or One or more instructions for placing at least a second portion of the combination on a second support; or One or more instructions for placing a separator on a first side of the first support and on a first side of the second support, the separator including polypropylene and a solution including sulfuric acid;

One or more instructions for reacting graphite in a first container including a first acid under first sufficient reaction conditions to form acid intercalated graphite; or One or more instructions for heating the acid intercalated graphite under sufficient conditions to form graphite nanoplatelets; or One or more instructions for reacting the graphite nanoplatelets in a second container including a second acid under second sufficient reaction conditions to form functionalized graphite nanoplatelets; or One or more instructions for combining the ruthenium with the functionalized graphite nanoplatelets to produce a result; or One or more instructions for reducing the result with a solution including sodium.

| 306 A computer readable medium | 308 A recordable medium | 310 A communications medium |

Fig. 5

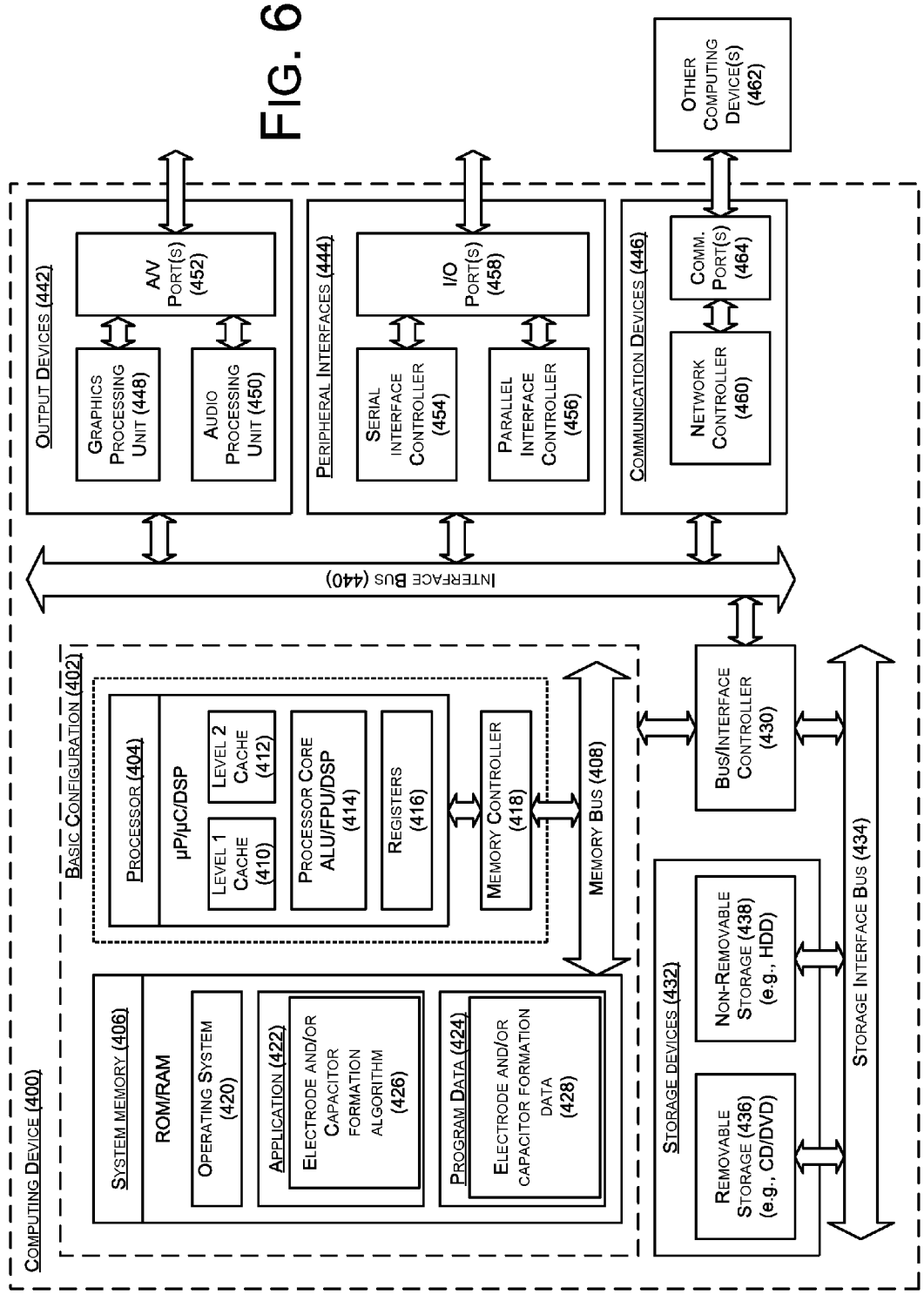

ELECTRODE AND/OR CAPACITOR FORMATION

CROSS REFERENCE TO RELATED APPLICATIONS

This application is a U.S. National Stage filing under 35 U.S.C. § 371 of International Application No. PCT/IB2011/001689 filed on Jul. 20, 2011, which claims priority to Indian Patent Application No. 1855/CHE/2011 filed on May 31, 2011. The entirety of both of these applications are hereby incorporated by reference.

BACKGROUND

Unless otherwise indicated herein, the materials described in this section are not prior art to the claims in this application and are not admitted to be prior art by inclusion in this section.

A capacitor may include two or more electrodes separated by a distance and/or separated by a separator or dielectric material. A supercapacitor may include two or more electrodes separated by a separator that may include an electrolyte. In examples when a voltage is applied across the two electrodes, a positively charged electrode and a negatively charged electrode may be formed. Positively charged ions in the electrolyte may tend to move toward the negatively charged electrode forming a first capacitor. Negatively charged ions in the electrolyte may tend to move toward the positively charged electrode forming a second capacitor in series with the first capacitor. The first and second capacitors in series may function as a single supercapacitor.

SUMMARY

This disclosure generally describes techniques related to the design, manufacture and/or use of components such as electrodes, capacitors, or any other similar component. Examples further described herein may include systems, methods, materials and/or devices.

In some examples, a method of forming a component is generally described. An example method may comprise combining ruthenium oxide with graphite nanoplatelets to form a combination, and placing at least a part of the combination on a support. In some further examples, the support may include a first support and a second support, where the part may be placed on the support by: placing at least a first portion of the combination on the first support, placing at least a second portion of the combination on the second support, and placing a separator on a first side of the first support and on a first side of the second support. In some examples, the separator may include an electrolyte. In additional examples, the separator may include polypropylene and a solution including sulfuric acid.

In some additional examples, a system effective to form a component is generally described. An example system may comprise one or more of a container, a coating device and/or a processor. The container may be configured effective to receive graphite nanoplatelets and effective to receive ruthenium chloride. The coating device may be arranged in communication with the first container. The processor may be arranged in communication with the first container and the coating device, where the processor may be configured to control one or more of the first container and/or the coating device. In some examples, the processor is configured to control the first container effective to combine the ruthenium chloride with the graphite nanoplatelets under reaction conditions sufficient to form a ruthenium oxide graphite nanoplatelets nanocomposite. In some additional examples, the processor is configured to control the coating device effective to coat a support with the ruthenium oxide graphite nanoplatelets nanocomposite.

In some examples, a component is generally described. In an example, the component may include a support and a nanocomposite on the support. The nanocomposite may include ruthenium oxide and graphite nanoplatelets.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a computer program product that can be utilized to implement electrode and/or capacitor formation; and FIG. 6 is a block diagram illustrating an example computing device that is arranged to implement electrode and/or capacitor formation;

Figure 1:
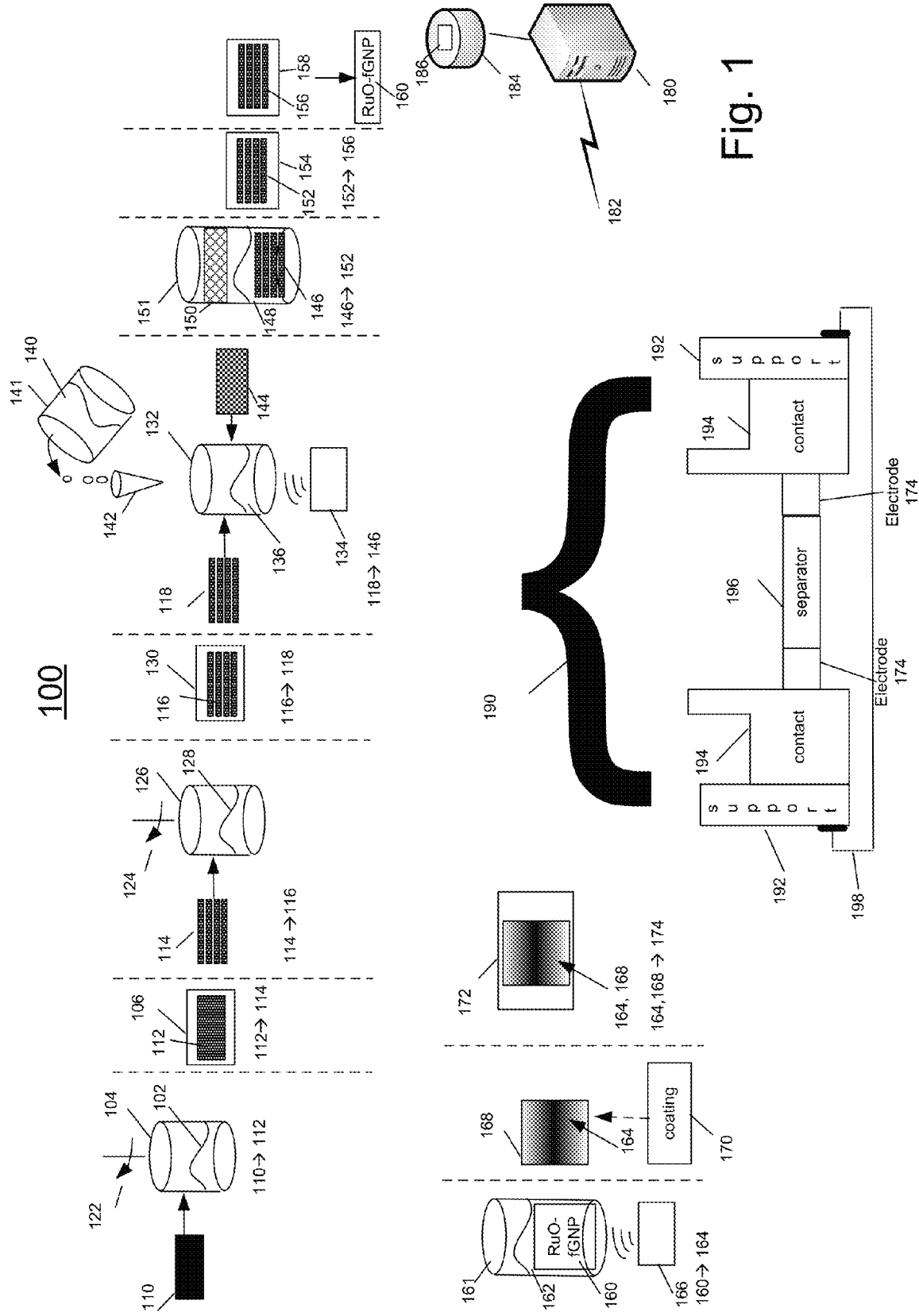
FIG. 1 illustrates an example system that can be utilized to implement electrode and/or capacitor formation.

all according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to electrode and/or capacitor formation.

Briefly stated, technologies are generally described related to the design, manufacture and/or use of electrodes, capacitors, or any other similar component. In an example, a system effective to form a component may include a container effective to receive graphite nanoplatelets and effective to receive ruthenium chloride. The system may include a coating device in communication with the container. The system may further include a processor arranged in communication with the container and the coating device. The processor may be configured to control the container effective to combine the ruthenium chloride with graphite nanoplatelets under reaction conditions sufficient to form a ruthenium oxide graphite nanoplatelets nanocomposite. The processor may further be configured to control the coating device effective to coat a support with the ruthenium oxide graphite nanoplatelets nanocomposite.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement electrode and/or capacitor formation in accordance with at least some embodiments described herein. An example component or electrode and/or capacitor formation system 100 may include graphite 110, a container 104, a stirring device 122, an oven 106, a container 126, and/or a stirring device 124. An example formation system 100 may further include one or more of a chamber 130, a container 132, ruthenium chloride 144, a container 141, a burette 142 and/or a sonicator 134. An example formation system 100 may further include a filter 150, an oven 154, an oven 158, a container 161, a sonicator 166, carbon paper 168 and/or an oven 172. Some of these elements may be arranged in communication and some elements may be combined in a single housing, such as in a chemical vapor deposition chamber, and/or used one or more times in example processes described below. At least some of these elements may be arranged in communication with a processor 180 through a communication link 182. In some examples, processor 180 may be adapted in communication with a memory 184 that may include instructions 186 stored therein. Processor 180 may be configured, such as by instructions 186, to control at least some of the operations/actions/functions described below.

In an example, graphite 110 may be combined with acid 102 including, for example, nitric acid $HNO_3$ and/or sulfuric acid $H_2SO_4$, such as by hand or machine. The combination of graphite 110 and acid 102 may be placed in container 104. The combination of graphite 110 and acid 102 may be stirred at a rate in a range from about 250 to about 500 revolutions per minute by a stirring device 122 for about 72 hours. In an example, a ratio of nitric acid to sulfuric acid may be 1:3. In an example, a ratio of acid 102 to graphite 110 may be 1:5. Acid 102 may react with or oxidize graphite 110 forming acid intercalated graphite 112.

Acid intercalated graphite 112 may be placed, such as by hand or machine, into an oven 106. Oven 106 may be controlled, such as by processor 180, to produce heat at about 1000 degrees Celsius for a time interval of about 1 minute to about 5 minutes. Heat from oven 106 may effectively provide thermal energy sufficient to react or de-stack acid intercalated graphite 112 to form graphite nanoplatelets 114. Graphite nanoplatelets 114 may include stacks where each stack includes a range of about 10 layers to about 20 layers of graphene. Graphene corresponds to a one atom thick layer of bonded carbon atoms. Graphite nanoplatelets 114 may be combined with nitric acid 128 in a container 126. The combination of graphite nanoplatelets 114 and nitric acid 128 may be stirred at a rate in a range of about 250 to about 500 revolutions per minute by stirring device 124 for a time interval of about 2 hours to react or form functionalized graphite nanoplatelets 116. For example, hydrophilic functional groups such as —COOH, —C=O, and —OH may be added to graphite nanoplatelets. Functionalized graphite nanoplatelets may provide anchoring sites for ruthenium oxide nanoparticles as discussed below. Functionalized graphite nanoplatelets 116 may be washed with deionized water and then dried in chamber 130 at about 60 degrees Celsius in an atmosphere of about a vacuum for a time interval of about 1 hour to form dried functionalized graphite nanoplatelets 118.

Dried functionalized graphite nanoplatelets 118 may be placed, such as by hand or machine, into a container 132 and dispersed in distilled water 136. Container 132 may be sonicated by a sonicator 134 for a time interval in a range from about 15 minutes to about 20 minutes. Ruthenium chloride ($RuCl_3$) 144 may be combined with, such as by hand or machine, dried functionalized graphite nanoplatelets 118 in container 132. In an example, an amount of ruthenium chloride may be used such that 25% weight of ruthenium oxide, of a desired total weight of a formed nanocomposite may be achieved. The ruthenium chloride may be combined with dried functionalized graphite nanoparticles 118. A solution 140, from a container 141, of about 1M NaOH and/or about 0.1M $NaBH_4$ may be combined with the combination of ruthenium chloride 144 and dried functionalized graphite nanoplatelets 118. The combination may be formed by a drop method using a burette 142. In an example, the combination may be over a time interval of about 24 hours. In an example, a ratio of solution 140 to dried functionalized graphite nanoplatelets 118 may be 1:1. The combination may be utilized to form a product 146.

Product 146 may be washed with deionized water 148 and then filtered with a filter 150 in a container 151 to form a filtered product 152. In an example, filter 150 may have a pore size of about 1 nanometer. Filtered product 152 may be dried in a vacuum in an oven 154 at a temperature of about 60 degrees Celsius for a time interval of about 2 hours to form a sample 156 including ruthenium combined with functionalized graphite nanoparticles. Sample 156 may be dried in air in an oven 158 at about 350 degrees Celsius for about 2 hours to form a nanocomposite 160 including ruthenium oxide on functionalized graphite nanoparticles.

Nanocomposite 160 may be dispersed in a solution 162 in a container 161. Solution 162 may include ethanol and a binder such as NAFION. In an example, about 20 microliters of 5% weight NAFION may be used with 5 mg of nanocomposite 160. Nanocomposite 160 and solution 162 may be sonicated by a sonicator 166 to form a paste 164. A portion of paste 164 may be placed on to a carbon paper 168 using a coating device 170 such as by brushing, spray coating, etc. Carbon paper 168 may be a sheet of any material coated at least partially with conducting graphitized carbon. Carbon paper 168 may be flexible and may be used to form a roll type electrode and/or capacitor. Carbon paper 168 and paste 164 may be dried in an oven 172 in an atmosphere of about a vacuum for about 12 hours to form an electrode 174. In these examples, carbon paper 168 may form a conducting support to distribute paste 164.

In an example of making a capacitor 190, two electrodes 174 may be formed using the process described above. A first current collector or contact 194, such as a stainless steel plate, may be placed on a support 192 such as a PERSPEX sheet. A first electrode 174 may be placed on contact 194. A separator or membrane 196 may be placed on first electrode 174. Separator or membrane 196 may include a polypropylene sheet and a 1M solution of $H_2SO_4$ electrolyte. A second electrode 174 may be place on separator 196. A second contact 194 may be placed on second electrode 174 and a second support 192 may be placed on the second contact 194. A clamp 198 may be used to hold the elements in capacitor 190 together.

Among other benefits, a system arranged in accordance with the present disclosure may be used to form a capacitor with a relatively high capacitance and high energy density and at a relatively low cost. As graphite nanoparticles may be used, a large surface area may be created and small distance between charge in the electrolyte and the electrode thereby increasing specific capacitance. As functionalized graphite nanoparticles may be used, agglomeration of ruthenium oxide may be avoided.

Figure 2A:
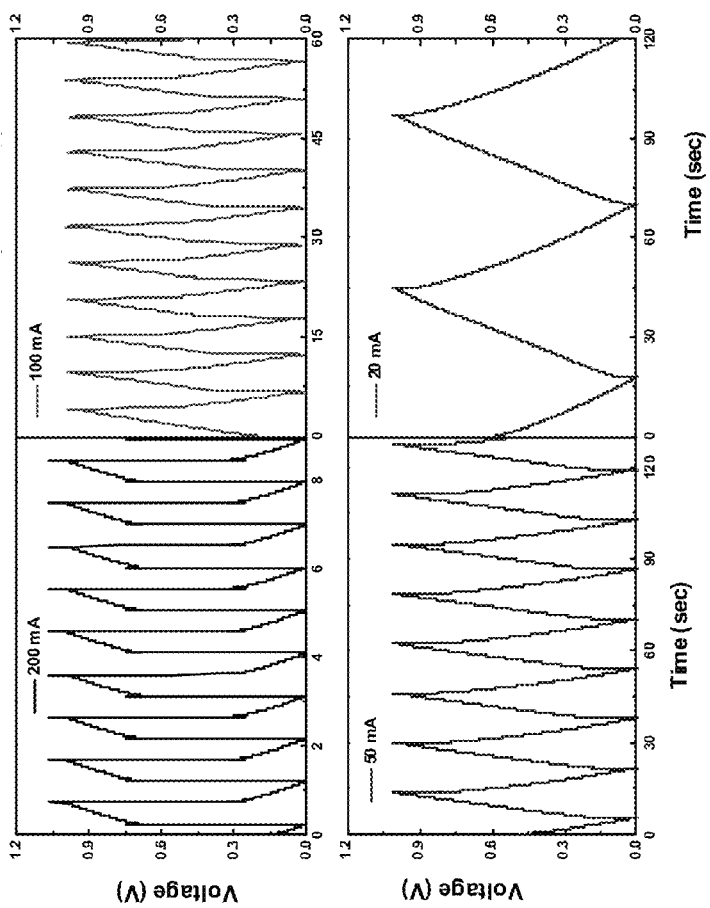
FIG. 2A illustrates a graph of electrical charge-discharge characteristics of an example capacitor that may be formed.

FIG. 2A illustrates a graph of electrical charge-discharge characteristics of an example capacitor that may be formed according to at least some embodiments described herein. The characteristics shown in FIG. 2A may relate a capacitor including electrodes with about 3 mg of nanocomposite including ruthenium oxide and graphite nanoplatelets coated on a 3 cm×3 cm piece of carbon paper. FIG. 2A illustrates an example graph of Voltage (V) with respect to Time (sec) for discharge currents of about 200 mA, 100 mA, 50 mA and about 20 mA.

As can been seen in FIG. 2A, for higher currents such as 100 mA and 200 mA, the capacitor may show a sharp drop or rise in voltage. The example capacitor showed a drop between about IV to about 0.25V, and a rise between about 0V and about 0.7V, for 200 mA, in less than about 0.5 seconds. The example capacitor showed a drop or rise between about IV and about 0.5V for 100 mA in less than about 3 seconds. The example capacitor showed a drop or rise between about 1V and about 0.5V for 50 mA in less than about 5 seconds. The example capacitor showed a drop or rise between about 1V and about 0.5V for 20 mA in less than about 17 seconds.

Figure 2B:
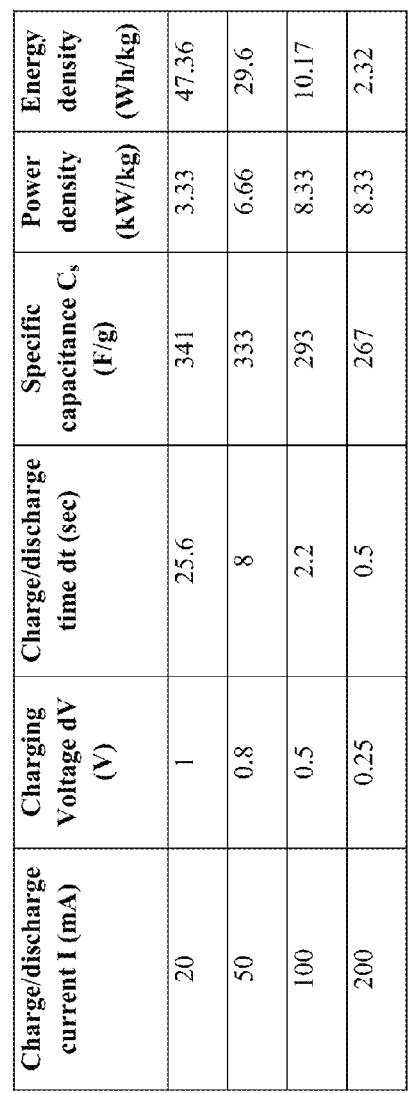
FIG. 2B illustrates a table of electrical charge-discharge characteristics of an example capacitor that may be formed.

FIG. 2B illustrates a table of electrical charge-discharge characteristics of an example capacitor that may be formed according to at least some embodiments described herein. The table in FIG. 2B illustrates Charge/discharge current I (mA), Charging voltage dV (V), Charge/discharge time dt (sec), Specific capacitance $C_s$ (F/g), Power density (kW/kg), and Energy density (Wh/kg) for an example capacitor formed in accordance with this disclosure. As shown, for a Charge/discharge current I (mA) of 20, Charging voltage dV (V) was 1, Charge/discharge time dt (sec) was 25.6, Specific capacitance $C_s$ (F/g) was 341, Power density (kW/kg) was 3.33, and Energy density (Wh/kg) was 47.36. For a Charge/discharge current I (mA) of 50, Charging voltage dV (V) was 0.8, Charge/discharge time dt (sec) was 8, Specific capacitance $C_s$ (F/g) was 333, Power density (kW/kg) was 6.66, and Energy density (Wb/kg) was 29.6. For a Charge/discharge current I (mA) of 100, Charging voltage dV (V) was 0.5, Charge/discharge time dt (sec) was 2.2, Specific capacitance $C_s$ (F/g) was 293, Power density (kW/kg) was 8.33, and Energy density (Wh/kg) was 10.17. For a Charge/discharge current I (mA) of 200, Charging voltage dV (V) was 0.25, Charge/discharge time dt (sec) was 0.5, Specific capacitance $C_s$ (F/g) was 267, Power density (kW/kg) was 8.33, and Energy density (Wh/kg) was 2.32.

Figures 3A, 3B:
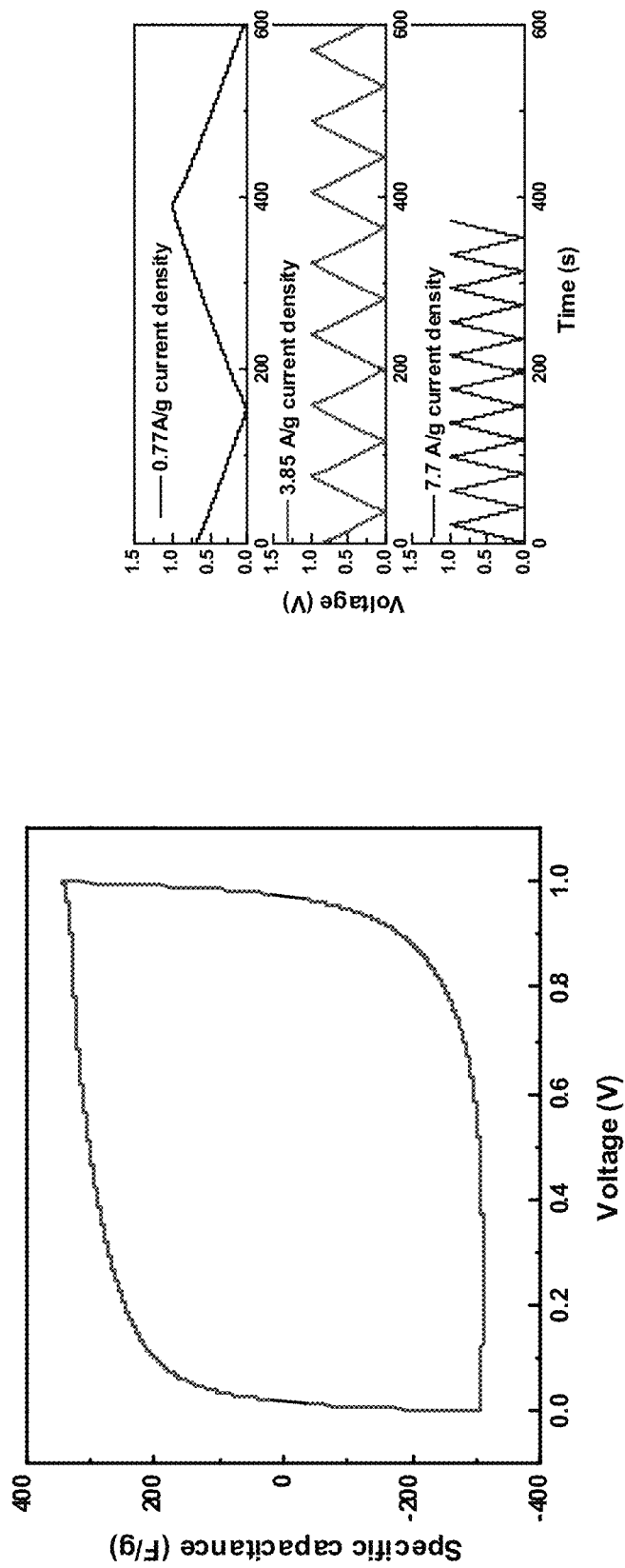
FIGS. 3A and 3B illustrate graphs of capacitive characteristics of an example capacitor that may be formed.

FIGS. 3A and 3B illustrate graphs of electrical characteristics of an example capacitor that may be formed according to at least some embodiments described herein. FIG. 3A illustrates a cyclic voltammetry curve of specific capacitance (F/g) with respect to Voltage (V) for a capacitor that may be formed in accordance with the present disclosure at about a 100 mV/s scan rate. As shown for the example capacitor, a shape of the capacitance to voltage curve is nearly rectangular. That is, at about 0.0 volts, the specific capacitance was about −300 F/g; at about 0.1 volts, the specific capacitance was about 200 F/g; at about 0.8 volts, the specific capacitance was about −250 F/g; and at about 1.0 volts, the specific capacitance was about 350 F/g.

FIG. 3B illustrates galvanostatic charge/discharge curves of Voltage (V) with respect to Time (s) for a capacitor that may be formed in accordance with the present disclosure. The curves illustrate current densities of about 0.77, 3.85 and about 7.7 A/g. In an example, a specific capacitance was determined to be 308 F/g with an energy density of 42.78 Wh/kg at these discharge densities and at power densities of about 0.385, 1.925 and about 3.85 kW/kg. As shown, for a 0.77 A/g current density, a voltage may substantially follow a triangular wave between about 0.0 volts and about 1.0 volts with a cycle of about 900 seconds. For a 3.85 A/g current density, a voltage may substantially follow a triangular wave between about 0.0 volts and about 1.0 volts with a cycle of about 75 seconds. For a 7.7 A/g current density, a voltage may substantially follow a triangular wave between about 0.0 volts and about 1.0 volts with a cycle of about 25 seconds.

Figure 4:
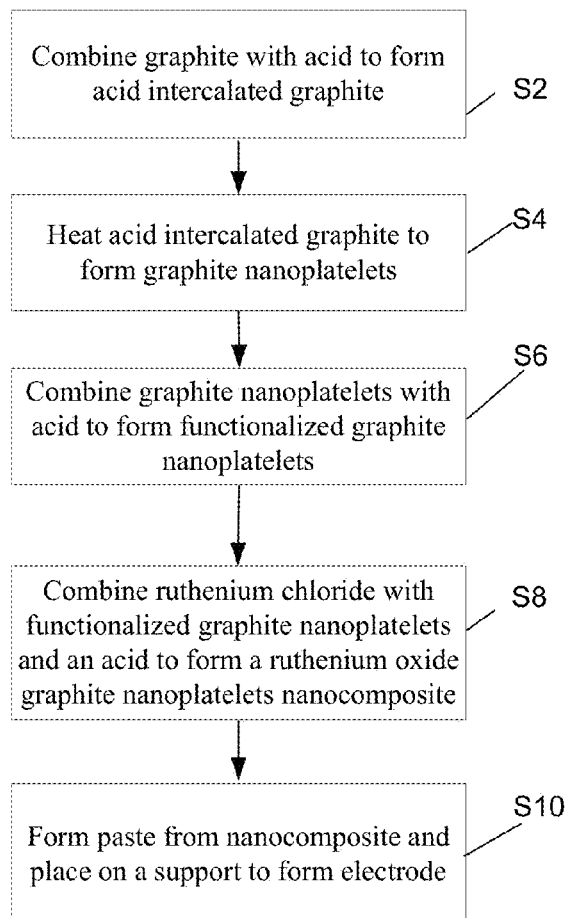
FIG. 4 depicts a flow diagram for an example process for forming an electrode and/or a capacitor.

FIG. 4 depicts a flow diagram for an example process 200 for forming an electrode and/or a capacitor in accordance with at least some embodiments described herein. The process in FIG. 4 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Process 200 may begin at block S2, "Combine graphite with acid to form acid intercalated graphite." In some examples, the graphite may be combined with acid by hand or by machine, such as a mixer. In some examples, the acid may include nitric acid or sulfuric acid and the combination of acid and graphite may be stirred such as by a stirring device at a rate in a range of, for example, about 250 to about 500 revolutions per minute for about 36 hours.

Processing may continue from block S2 to block S4, "Heat acid intercalated graphite to form graphite nanoplatelets." In some examples, the acid intercalated graphite may be heated by an oven to about 1000 degrees Celsius for a time interval in a range between about 1 minute and about 5 minutes so that the thermal energy may break stacks of the graphite and form graphite nanoplatelets.

Processing may continue from block S4 to block S6, "Combine graphite nanoplatelets with acid to form functionalized graphite nanoplatelets." In some examples, the graphite nanoplatelets may be combined by hand or by machine, such as with a mixer, with an acid. In some examples, the acid may include nitric acid and the combination may be stirred by a stirring device at a rate in a range of about 250 to about 500 revolutions per minute for about 2 hours.

Processing may continue from block S6 to block S8, "Combine ruthenium chloride with functionalized graphite nanoplatelets and an acid to form a ruthenium oxide graphite nanoplatelets nanocomposite." In some examples, ruthenium chloride may be combined, such as by hand, burette, or by machine, such as with a mixer, with the functionalized graphite nanoplatelets in a container. A solution of NaOH and/or $NaBH_4$ may be combined into the container, such as by hand or machine and the combination may be sonicated by a sonicator, and filtered by a filter to form the nanocomposite.

Processing may continue from block S8 to block S10, "Form paste from nanocomposite and place on a support to form electrode." In an example, the paste may be formed using a container and a sonicator. In an example, the nanocomposite may be combined in a container, such as by hand or machine, with a solution including ethanol and binder such as NAFION. The combination may be sonicated by a sonicator to form the paste. The paste may be placed, such as by using a coating device, on a support such as carbon paper.

FIG. 5 illustrates a computer program product that can be utilized to implement graphene formation in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, processor 180 may undertake one or more of the blocks shown in FIG. 5 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 6 is a block diagram illustrating an example computing device that is arranged to implement graphene formation according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an electrode and/or capacitor formation algorithm 426 that can be arranged to perform the various functions/actions/operations as described herein including at least those described with respect to system 100 of FIGS. 1-5. Program data 424 may include electrode and/or capacitor formation data 428 that may be useful for implementing electrode and/or capacitor formation as is described herein. In some embodiments, application 422 may be arranged to operate with program data 424 on operating system 420 such that electrode and/or capacitor formation may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more AN ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g.,"a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B; or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system effective to form a component, the system comprising:
 a container configured effective to receive graphite nanoplatelets and effective to receive ruthenium chloride;
 a coating device arranged in communication with the first container; and
 a processor arranged in communication with the first container and the coating device, wherein the processor is configured to:
  control the first container effective to combine the ruthenium chloride with the graphite nanoplatelets under reaction conditions sufficient to form a ruthenium oxide graphite nanoplatelets nanocomposite; and
  control the coating device effective to coat a support with the ruthenium oxide graphite nanoplatelets nanocomposite.

2. The system as recited in claim 1, wherein the container is a first container, and the system further comprises:
   a second container arranged in communication with the first container, wherein the second container is effective to receive graphite and an acid; and
   wherein:
   the processor is further configured to control the second container to react the acid and the graphite under reaction conditions sufficient to form the graphite nanoplatelets.

3. The system as recited in claim 1, wherein the container is a first container, and the system further comprises:
   a second container arranged in communication with the first container, wherein the second container is effective to receive graphite and a first acid;
   a third container arranged in communication with the first container and the second container, wherein the third container includes a second acid;
   the processor is further configured to:
      control the second container effective to react the first acid and the graphite under reaction conditions sufficient to form the graphite nanoplatelets;
      control the third container effective to react the second acid and the graphite nanoplatelets under sufficient reaction conditions to form functionalized graphite nanoplatelets; and
      control the third container effective to combine the ruthenium chloride with the functionalized graphite nanoplatelets under reaction conditions sufficient to form a ruthenium oxide graphite nanoplatelets nanocomposite.

4. The system as recited in claim 1, wherein the container is a first container, and the system further comprises:
   an oven;
   a second container arranged in communication with the oven and the first container, wherein the second container is effective to receive graphite and a first acid;
   a third container arranged in communication with the first container and the second container, wherein the third container includes a second acid; and
   a fourth container; and wherein:
   the processor is further configured to:
      control the second container effective to react the first acid and the graphite reaction conditions sufficient to form acid intercalated graphite;
      control the oven effective to heat the acid intercalated graphite under sufficient reaction conditions to form the graphite nanoplatelets;
      control the third container to effective to react the second acid and the graphite nanoplatelets under sufficient reaction conditions to form functionalized graphite nanoplatelets;
      control the first container effective to combine the ruthenium chloride with the functionalized graphite nanoplatelets to form a result; and
      control the fourth container effective to reduce the result with a solution including sodium to form the ruthenium oxide graphite nanoplatelets nanocomposite.

5. The system as recited in claim 1, wherein the coating device is configured effective to brush at least a part of the combination on a first piece of carbon paper, and brush at least a part of the combination on a second piece of carbon paper.

6. A component comprising:
   a support;
   a nanocomposite on the support, wherein the nanocomposite includes ruthenium oxide and graphite nanoplatelets, wherein the graphite nanoplatelets include stacks of layers of graphene.

7. The component as recited in claim 6, wherein the support is a first support, and the component further comprises:
   the nanocomposite on a second support; and
   a separator between the first and the second support, wherein the separator includes an electrolyte.

8. The component as recited in claim 6, wherein:
   the nanocomposite includes ruthenium oxide nanoparticles.

9. The component as recited in claim 6, wherein the support is a first support, and the component further comprises:
   the nanocomposite on a second support; and
   a separator between the first and the second support, wherein the separator includes polypropylene and a solution including sulfuric acid.

10. The component as recited in claim 6, wherein the support is a first support, and the component further comprises:
    the nanocomposite on a second support;
    a separator on a first side of the first support and on a first side of the second support, wherein the separator includes polypropylene and a solution including sulfuric acid;
    a first contact on a second side of the first support; and
    a second contact on a second side of the second support.

11. The component as recited in claim 6, wherein the support is a first support, and the component further comprises:
    the nanocomposite on a second support;
    a separator on a first side of the first support and on a first side of the second support, wherein the separator includes polypropylene and a solution including sulfuric acid;
    a first contact on a second side of the first support;
    a second contact on a second side of the second support;
    a third support on the first contact;
    a fourth support on the second contact; and
    a clamp on the third and fourth support.

* * * * *